(12) United States Patent
Asaka et al.

(10) Patent No.: US 9,979,980 B2
(45) Date of Patent: *May 22, 2018

(54) VIDEO ENCODING APPARATUS AND A VIDEO DECODING APPARATUS

(71) Applicant: KABUSHIKI KAISHA TOSHIBA, Minato-ku (JP)

(72) Inventors: Saori Asaka, Tokyo (JP); Takeshi Chujoh, Kawasaki (JP); Akiyuki Tanizawa, Kawasaki (JP); Goki Yasuda, Kawasaki (JP); Naofumi Wada, Yokohama (JP); Takashi Watanabe, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/446,477

(22) Filed: Mar. 1, 2017

(65) Prior Publication Data

US 2017/0171556 A1    Jun. 15, 2017

Related U.S. Application Data

(60) Division of application No. 14/201,412, filed on Mar. 7, 2014, now Pat. No. 9,628,794, which is a
(Continued)

(51) Int. Cl.
*H04N 19/583* (2014.01)
*H04N 19/513* (2014.01)
*H04N 19/176* (2014.01)

(52) U.S. Cl.
CPC ......... *H04N 19/513* (2014.11); *H04N 19/176* (2014.11)

(58) Field of Classification Search
None
See application file for complete search history.

(56) References Cited

U.S. PATENT DOCUMENTS 6,289,049 B1   9/2001   Kim et al.
6,348,954 B1   2/2002   Takashima et al.
(Continued)

FOREIGN PATENT DOCUMENTS

CN   1449197 A   10/2003
CN   1592421 A    3/2005
(Continued)

OTHER PUBLICATIONS

ITU-T H.264 Advanced Vdieo coding for generic audiovisual service (May 2003).*
(Continued)

*Primary Examiner* — Kate Luo
(74) *Attorney, Agent, or Firm* — Oblon, McClelland, Maier & Neustadt, L.L.P.

(57) ABSTRACT

A video encoding apparatus is a video encoding apparatus for subjecting a video image to motion compensated prediction coding, comprising an acquisition module to acquire available blocks of blocks having motion vectors from encoded blocks adjacent to a to-be-encoded block and number of the available blocks, an acquisition/selection module to select one selection block from the encoded available blocks, a selection information encoder to encode selection information specifying the selection block using a code table corresponding to the number of available blocks, and an image encoder to subject the to-be-encoded block to motion compensated prediction coding using a motion vector of the selection block.

5 Claims, 13 Drawing Sheets

Related U.S. Application Data continuation-in-part of application No. 13/325,856, filed on Dec. 14, 2011, now Pat. No. 9,167,273, which is a continuation of application No. PCT/JP2009/061130, filed on Jun. 18, 2009.

(56) References Cited

U.S. PATENT DOCUMENTS

| | | | |
|---|---|---|---|
| 6,498,810 | B1 | 12/2002 | Kim et al. |
| 6,876,702 | B1 | 4/2005 | Hui et al. |
| 7,031,387 | B2 | 4/2006 | Jeon |
| 7,233,621 | B2 | 6/2007 | Jeon |
| 7,233,622 | B2 | 6/2007 | Winger et al. |
| 7,308,143 | B2 | 12/2007 | Abe et al. |
| 7,394,853 | B2 | 7/2008 | Kondo et al. |
| 7,573,407 | B2 | 8/2009 | Reznik |
| 7,852,936 | B2 | 12/2010 | Mukerjee et al. |
| 8,290,046 | B2 | 10/2012 | Kondo et al. |
| 2004/0066848 | A1 | 4/2004 | Jeon |
| 2004/0136461 | A1* | 7/2004 | Kondo .......... H04N 19/105 375/240.16 |
| 2004/0252768 | A1 | 12/2004 | Suzuki et al. |
| 2006/0209952 | A1* | 9/2006 | Tanizawa .......... H04N 19/176 375/240.03 |
| 2007/0047652 | A1 | 3/2007 | Maruyama et al. |
| 2008/0165858 | A1* | 7/2008 | Karczewicz ....... H04N 19/176 375/240.23 |
| 2009/0074067 | A1 | 3/2009 | Jeon |
| 2009/0175349 | A1 | 7/2009 | Ye et al. |
| 2009/0180538 | A1 | 7/2009 | Visharam et al. |
| 2009/0304084 | A1 | 12/2009 | Hallapuro et al. |
| 2009/0316044 | A1 | 12/2009 | Chen et al. |

FOREIGN PATENT DOCUMENTS

| | | |
|---|---|---|
| CN | 1812586 A | 8/2006 |
| CN | 101005614 A | 7/2007 |
| CN | 101005620 A | 7/2007 |
| CN | 101099394 A | 1/2008 |
| CN | 101185083 A | 5/2008 |
| CN | 1650636 A | 8/2016 |
| JP | 03-253119 | 11/1991 |
| JP | 2003-299102 | 10/2003 |
| JP | 2004-129191 | 4/2004 |
| JP | 2004-208259 | 7/2004 |
| JP | 4020789 | 10/2007 |
| JP | 2008-519503 | 6/2008 |
| JP | 2008-205790 | 9/2008 |
| JP | 2008-211697 | 9/2008 |
| JP | 2008-312226 | 12/2008 |
| JP | 2014131289 A | 7/2014 |
| WO | WO 01/11891 A1 | 2/2001 |
| WO | WO 2006/052577 | 5/2006 |
| WO | WO 2008/086316 | 7/2008 |

OTHER PUBLICATIONS

Tourapis et al. "Direct macroblock coding for predictive (P) pictures in the H.264 standard". (Jan. 2004) Microsoft Research.

Chinese Office Action dated Aug. 3, 2016 for Chinese Application No. 201410082076.3 and English translation of relevant portions thereof.

Office Action dated Nov. 11, 2014 in Japanese Patent Application No. 2014-008162 (with English language translation).

Office Action dated Nov. 11, 2014 in Japanese Patent Application No. 2014-008163 (with English language translation).

Office Action dated Nov. 11, 2014 in Japanese Patent Application No. 2014-008164 (with English language translation).

International Search Report dated Aug. 11, 2009, issued for International Application No. PCT/JP2009/061130 (with English Translation) filed Jun. 18, 2009.

International Written Opinion dated Aug. 11, 2009 for International Application No. PCT/JP2009/061130 filed Jun. 18, 2009.

English Translation of the International Preliminary Report on Patentability dated Dec. 22, 2011 in PCT/JP2009/061130.

Extended European Search Report dated Jun. 11, 2013 in Patent Application No. 12178726.1.

J. Jung et al., "RD-Optimized Competition Scheme for Efficient Motion Prediction", Visual Communications and Image Processing, XP 030081116, vol. 6508, 2007, pp. 650815-1-650815-11.

Sung Deuk Kim et al., "An Efficient Motion Vector Coding Scheme Based on Minimum Bitrate Prediction", IEEE: Transactions on Image Processing, XP011026355, vol. 8, No. 8, Aug. 1999, pp. 1117-1120.

Alexis M. Tourapis et al., "Direct macroblock coding for predictive (P) pictures in H.264 standard", Visual Communications and Image Processing, XP030081301, vol. 5308, 2004, pp. 364-369.

European Search Report dated Jun. 11, 2013 in Patent Application No. 09846189.0.

Office Action dated Nov. 19, 2013 in Japanese Patent Application No. 2013-022546 (with English translation).

Office Action dated Mar. 17, 2015 in Japanese Patent Application No. 2014-008164 (with English language translation).

Combined Chinese Office Action and Search Report dated May 16, 2014 in Patent Application No. 200980159915.4 (with English language translation).

Office Action dated Aug. 3, 2016, in Chinese Patent Application No. 201410081638.2 with English-language Translation 11 pages.

Office Action dated Aug. 30, 2016, in Japanese Patent Application No. 2015-141999 with English-language Translation 4 pages.

Office Action dated Jul. 19, 2016, in Chinese Patent Application No. 201410082064.0 with English-language Translation 15 pages.

Office Action dated Jul. 5, 2016, in Chinese Patent Application No. 201410081594.3 with English-language Translation 12 pages.

Extended European Search Report dated Jul. 16, 2014, in European Patent Application No. 14158488.8.

* cited by examiner

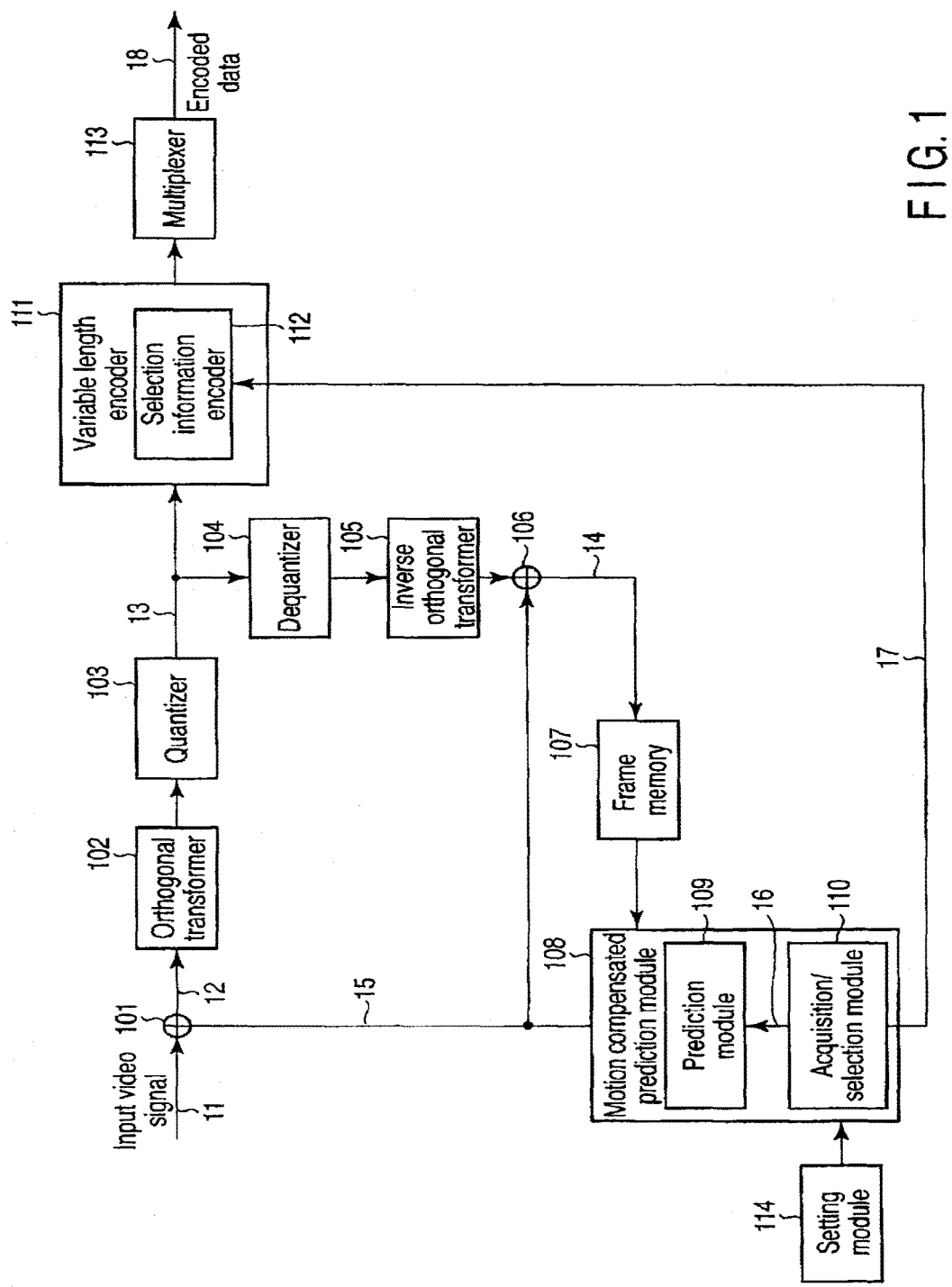
F I G. 1

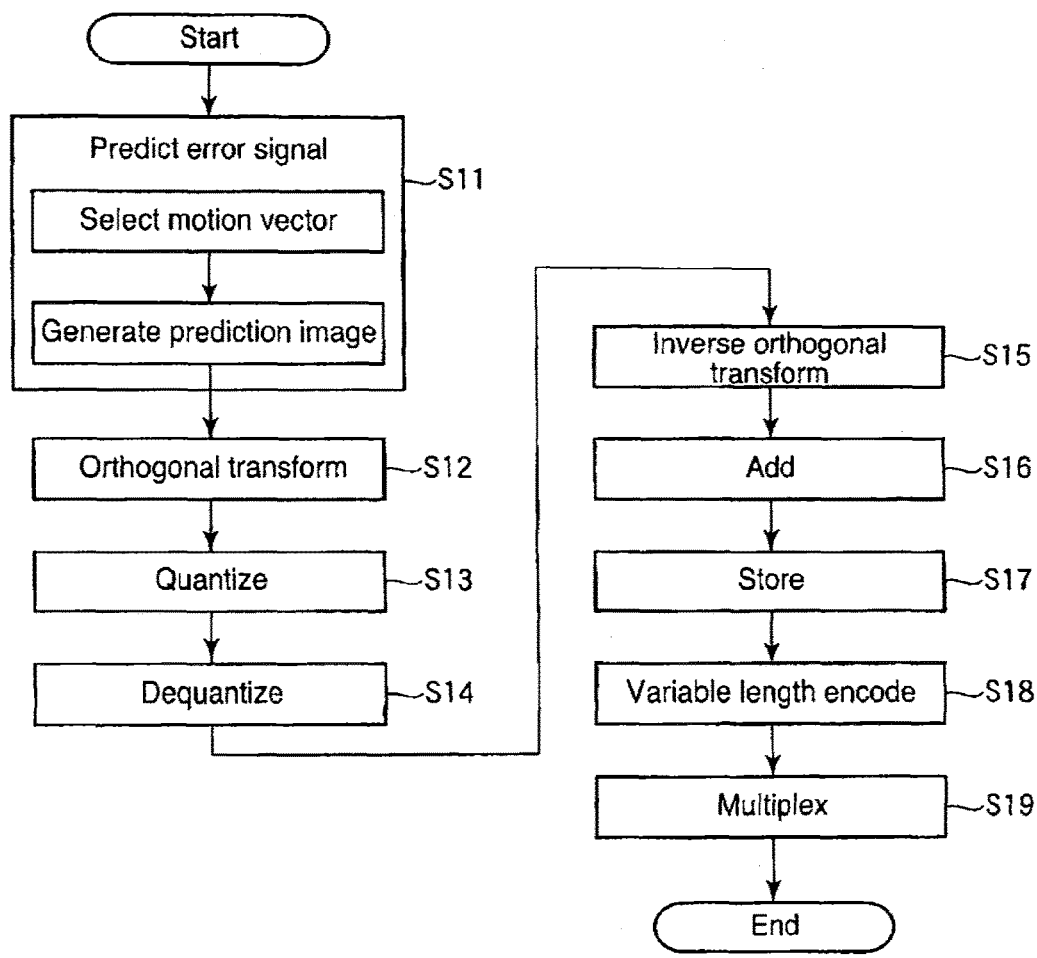
F I G. 2

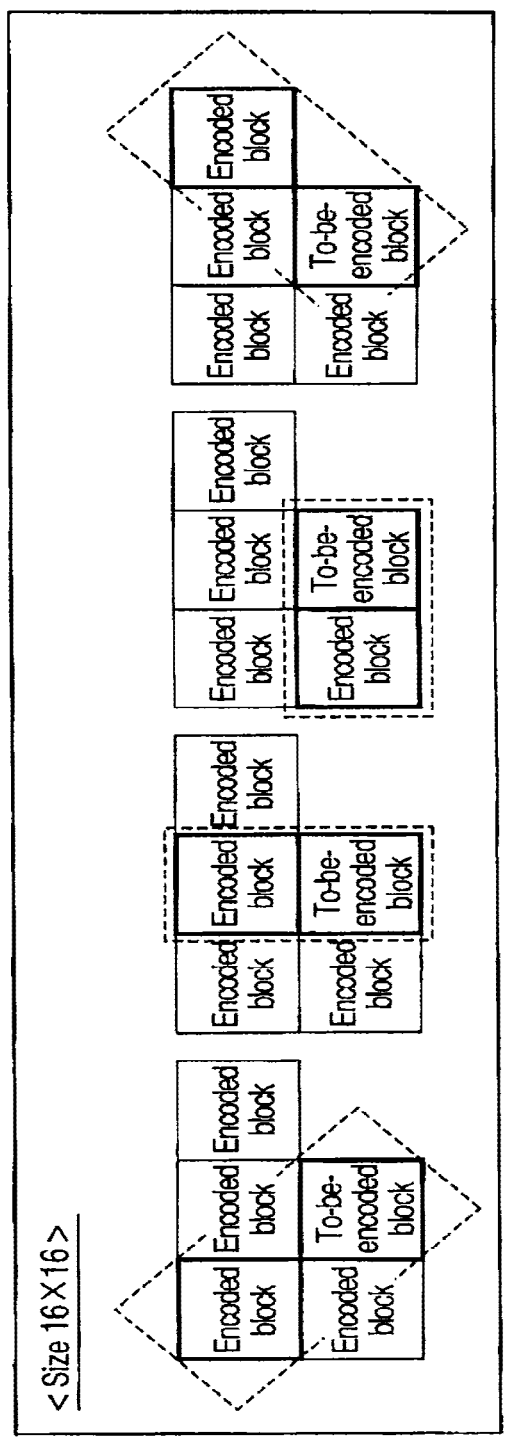
F I G. 4A

| <Two available blocks> | | <Three available blocks> | | <Four available blocks> | |
|---|---|---|---|---|---|
| Index | Code word | Index | Code word | Index | Code word |
| 0 | 0 | 0 | 0 | 0 | 0 |
| 1 | 1 | 1 | 10 | 1 | 10 |
| | | 2 | 11 | 2 | 110 |
| | | | | 3 | 111 |

(a)
```
Macroblock_layer( ){
    mb_type
    if (available_block_num>0)
        mv_copy_flag
    if (mvcopy_flag && available_block_num>1)
        mv_select_info
    ...
}
```

(b)
```
Macroblock_layer( ){
    if (available_block_num>0)
        mv_copy_flag
    if (mvcopy_flag && available_block_num>1)
        mv_select_info
    if (mvcopy_flag == 0)
        mb_type
    ...
}
```

F I G. 10

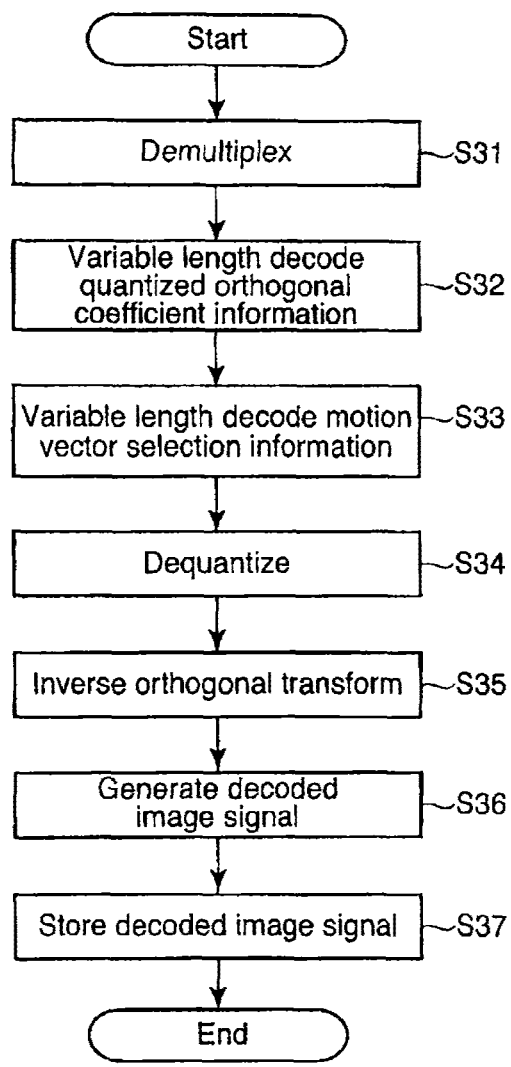
F I G. 12

VIDEO ENCODING APPARATUS AND A VIDEO DECODING APPARATUS

CROSS-REFERENCE TO RELATED APPLICATIONS

This is a Divisional Application of U.S. application Ser. No. 14/201,412, filed Mar. 7, 2014, which is a Continuation-In-Part Application of Continuation application Ser. No. 13/325,856 (now U.S. Pat. No. 9,167,273), filed Dec. 14, 2011, which is a Continuation Application of PCT Application No. PCT/JP2009/061130, filed Jun. 18, 2009, which was published under PCT Article 21(2) in Japanese. The entire contents of each of the above are incorporated herein by reference.

BACKGROUND OF THE INVENTION

1. Field of the Invention

The present invention relates to a video encoding apparatus and a video decoding apparatus which derive a motion vector from an encoded and decoded image and perform a motion compensated prediction.

2. Description of the Related Art

There is a motion compensated prediction as one of techniques used for encoding a video image.

In the motion compensated prediction, a video encoding apparatus acquires a motion vector using a to-be-encoded image to be newly encoded and a local decoded image already generated and generates a prediction image by carrying out motion compensation using this motion vector.

As one of methods for acquiring a motion vector in the motion compensated prediction, there is a direct mode for generating a prediction image using a motion vector of a to-be-encoded block derived from the motion vector of an encoded block (refer to Japanese Patent No. 4020789 and U.S. Pat. No. 7,233,621). Because the motion vector is not encoded in the direct mode, the number of encoded bits of the motion vector information can be reduced. The direct mode is employed in H.264/AVC.

BRIEF SUMMARY OF THE INVENTION

In the direct mode, a motion vector is generated by a method for calculating a motion vector from a median value of the motion vector of an encoded block adjacent to a to-be-encoded block in generating the motion vector of the to-be-encoded block by prediction. Therefore, degrees of freedom for calculating the motion vector calculation are low. In addition, when a method for calculating a motion vector by selecting one from a plurality of encoded blocks is used for improving the degrees of freedom, the position of the block must be always sent as motion vector selection information in order to indicate the selected encoded block. For this reason, the number of encoded bits may be increased.

It is an object of the present invention to provide a video encoding apparatus and a video decoding apparatus which reduce additional information of motion vector selection information while improving the degrees of freedom for calculating the motion vector by selecting one from encoded blocks.

An aspect of the present invention provides a video encoding apparatus for subjecting a video image to motion compensated prediction encoding, the apparatus comprising an acquisition module for acquiring available blocks having motion vectors and the number of the available blocks from encoded blocks adjacent to a to-be-encoded block, a selection module for selecting a selection block from the available blocks of the encoded blocks, a selection information encoding module for encoding selection information specifying the selection block using a code table corresponding to the number of the available blocks, and an image encoding module for subjecting the to-be-encoded block to motion compensated prediction encoding using the motion vector of the selected block.

Another aspect of the present invention provides a video decoding apparatus for subjecting a video image to motion compensated prediction decoding, the apparatus comprising a selection information decoding module for decoding selection information by switching a code table according to the number of available blocks of decoded blocks having motion vectors and neighboring a to-be-decoded block, a selection module for selecting a selection block from available blocks according to the selection information, and an image decoding module for subjecting a to-be-decoded image to motion compensated prediction decoding using a motion vector of the selection block by the selection module.

BRIEF DESCRIPTION OF THE SEVERAL VIEWS OF THE DRAWINGS

FIG. 1 is a block diagram of a video encoding apparatus related to an embodiment of the present invention.

FIG. 2 is a flowchart representing a processing procedure of the video encoding apparatus.

FIG. 4A is a diagram for describing a discrimination method based on a block size.

FIG. 10 shows a data structure of a macroblock layer.

FIG. 12 shows a flowchart representing a processing procedure of the video decoding apparatus.

DETAILED DESCRIPTION OF THE INVENTION

Figure 3:
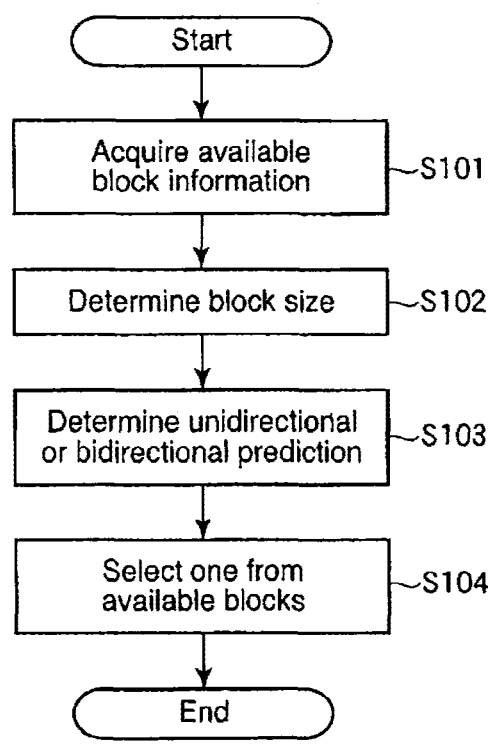
FIG. 3 is a flowchart representing a processing procedure of an acquisition/selection module.

There will now be explained embodiments of the present invention referring to drawings.

A video encoding apparatus related to an embodiment is described with reference to FIG. 1 hereinafter. A subtracter 101 calculates a difference between an input video signal 11 and a predictive coded video signal 15, and output a prediction error signal 12. The output terminal of the subtracter 101 is connected to a variable length encoder 111 through an orthogonal transformer 102 and a quantizer 103. The orthogonal transformer 102 orthogonal-transforms a prediction error signal 12 from the subtracter 101, and the quantizer 103 quantizes an orthogonal transformation coefficient and outputs quantization orthogonal transformation coefficient information 13. The variable length encoder 111 performs variable length encoding on the quantization orthogonal transformation coefficient information 13 from the quantizer 103.

The output terminal of the quantizer 103 is connected to an adder 106 through a dequantizer 104 and an inverse orthogonal transformer 105. The dequantizer 104 dequantizes the quantized orthogonal transformation coefficient information 13, and converts it in an orthogonal transformation coefficient. The inverse orthogonal transformer 105 converts the orthogonal transformation coefficient to a prediction error signal. The adder 106 adds the prediction error signal of the inverse orthogonal transformer 105 and the predictive coded video signal 15 to generate a local decoded image signal 14. The output terminal of the adder 106 is connected to a motion compensated prediction module 108 through a frame memory 107.

The frame memory 107 accumulates a local decoded image signal 14. A setting module 114 sets a motion compensated prediction mode (a prediction mode) of a to-be-encoded block. The prediction mode includes a unidirectional prediction using a single reference picture and a bidirectional prediction using two reference pictures. The unidirectional prediction includes L0 prediction and L1 prediction of AVC. A motion compensated prediction module 108 comprises a prediction module 109 and an acquisition/selection module 110.

The acquisition/selection module 110 acquires available blocks having motion vectors and the number of the available blocks from encoded blocks adjacent to the to-be-encoded block, and selects a selection block from the available blocks. The motion compensated prediction module 108 performs a prediction using a local decoded image signal 14 stored in the frame memory 107 as a reference image and generates a predictive coded video signal 15. The acquisition/selection module 110 selects one block (a selection block) from the adjacent blocks adjacent to the to-be-encoded block. For example, the block having an appropriate motion vector among the adjacent blocks is selected as the selection block. The acquisition/selection module 110 selects the motion vector of the selection block as a motion vector 16 to be used for the motion compensated prediction, and sends it to the prediction module 109. In addition, the acquisition/selection module 110 generates selection information 17 of the selection block and sends it to the variable length encoder 111.

The variable length encoder 111 has a selection information encoder 112. The selection information encoder 112 subjects the selection information 17 to variable length encoding while switching a code table so as to have therein the same number of entries as the available blocks of encoded blocks. The available block is a block having a motion vector among encoded blocks adjacent to the to-be-encoded block. A multiplexer 113 multiplexes quantized orthogonal transformation coefficient information and selection information and output encoded data.

The action of the video encoding apparatus of the above configuration will be described referring to the flowchart of FIG. 2.

At first a prediction error signal 12 is generated (S11). In generation of this prediction error signal 12, a motion vector is selected, and a prediction image is generated using the selected motion vector. The subtracter 101 calculates a difference between the signal of the prediction image, that is, the prediction image signal 15 and the input video signal 11 to generate the prediction error signal 12.

The orthogonal transformer 102 orthogonal-transforms the prediction error signal 12 to generate an orthogonal transformed coefficient (S12). The quantizer 103 quantizes the orthogonal transformed coefficient (S13). The dequantizer 104 dequantizes the quantized orthogonal transformed coefficient information (S14), and then subjects it to inverse orthogonal transform to provide a reproduced prediction error signal (S15). The adder 106 adds the reproduced prediction error signal and the predictive coded video signal 15 to generate a local decoded image signal 14 (S16). The local decoded image signal 14 is stored in the frame memory 107 (as a reference picture) (S17), and the local decoded image signal read from the frame memory 107 is inputted to the motion compensated prediction module 108.

The prediction module 109 of the motion compensated prediction module 108 subjects the local decoded image signal (reference image) to motion compensated prediction using the motion vector 16 to generate the predictive coded video signal 15. The predictive coded video signal 15 is sent to the subtracter 101 to calculate a difference with respect to the input video signal 11, and further is sent to the adder 106 to generate the local decoded image signal 14.

The acquisition/selection module 110 selects a selection block from adjacent blocks, generates selection information 17, and sends a motion vector 16 of the selection block to the prediction module 109 which performs the motion compensated prediction using the motion vector of the selection block. The selection information 17 is sent to the selection information encoder 112. When the selection block is selected from the adjacent blocks, the adjacent block having the appropriate motion vector allowing the amount of encoded bits to be decreased is selected.

The orthogonal transformation coefficient information 13 quantized with the quantizer 103 also is input to the variable length encoder 111 and is subjected to variable length coding (S18) The acquisition/selection module 110 outputs the selection information 16 used for motion compensated prediction, and inputs it to the selection information encoder 112. The selection information encoder 112 switches the code table so as to have therein the same number of entries as the available bocks of the encoded blocks neighboring the to-be-encoded block and having motion vectors, and the selection information 17 is subjected to variable length coding. The multiplexer 113 multiplexes the quantized orthogonal transformation coefficient information from the variable length encoder 111 and the selection information to output a bit stream of coded data 18 (S19) The coded data 18 is sent to a storage system (not shown) or a transmission path.

In the flowchart of FIG. 2, the flow of steps S14 to S17 may be replaced by the flow of steps S18 and S19.

In other words, the variable length coding step S18 and multiplexing step S19 may be executed following the quantization step S13, and the dequantizing step S14 to the storage step S17 may be executed following the multiplexing step S19.

The action of the acquisition/selection module 110 will be described referring to flowchart shown in FIG. 3.

At first the available block candidates being the encoded blocks neighboring the to-be-encoded block and having motion vectors are searched for (S101). When the available block candidates are searched for, the block size for motion compensated prediction of these available block candidates is determined (S102). Next, it is determined whether the available block candidates are a unidirectional prediction or a bidirectional prediction (S103). An available block is extracted from the available block candidates based on the determined result and the prediction mode of the to-be-encoded block. One selection block is selected for from the extracted available blocks, and information specifying the selection block is acquired as selection information (S104).

There will be described a process for determining a block size referring to FIGS. 4A to 4C (S102).

The adjacent blocks used in the present embodiment are assumed to be blocks, which are positioned at the left, upper left, upper and upper right of the to-be-encoded block. Therefore, when the to-be-encoded block positions the most upper left of the frame, this to-be-encoded block cannot be applied to the present invention because there is not the available block adjacent to the to-be-encoded block. When the to-be-encoded block is on the upper end of the screen, the available block is only a left block, and when the to-be-encoded block is on the extreme left and not on the extreme upper end, the two blocks of the to-be-encoded blocks which position the upper and upper right thereof.

Figure 4B:
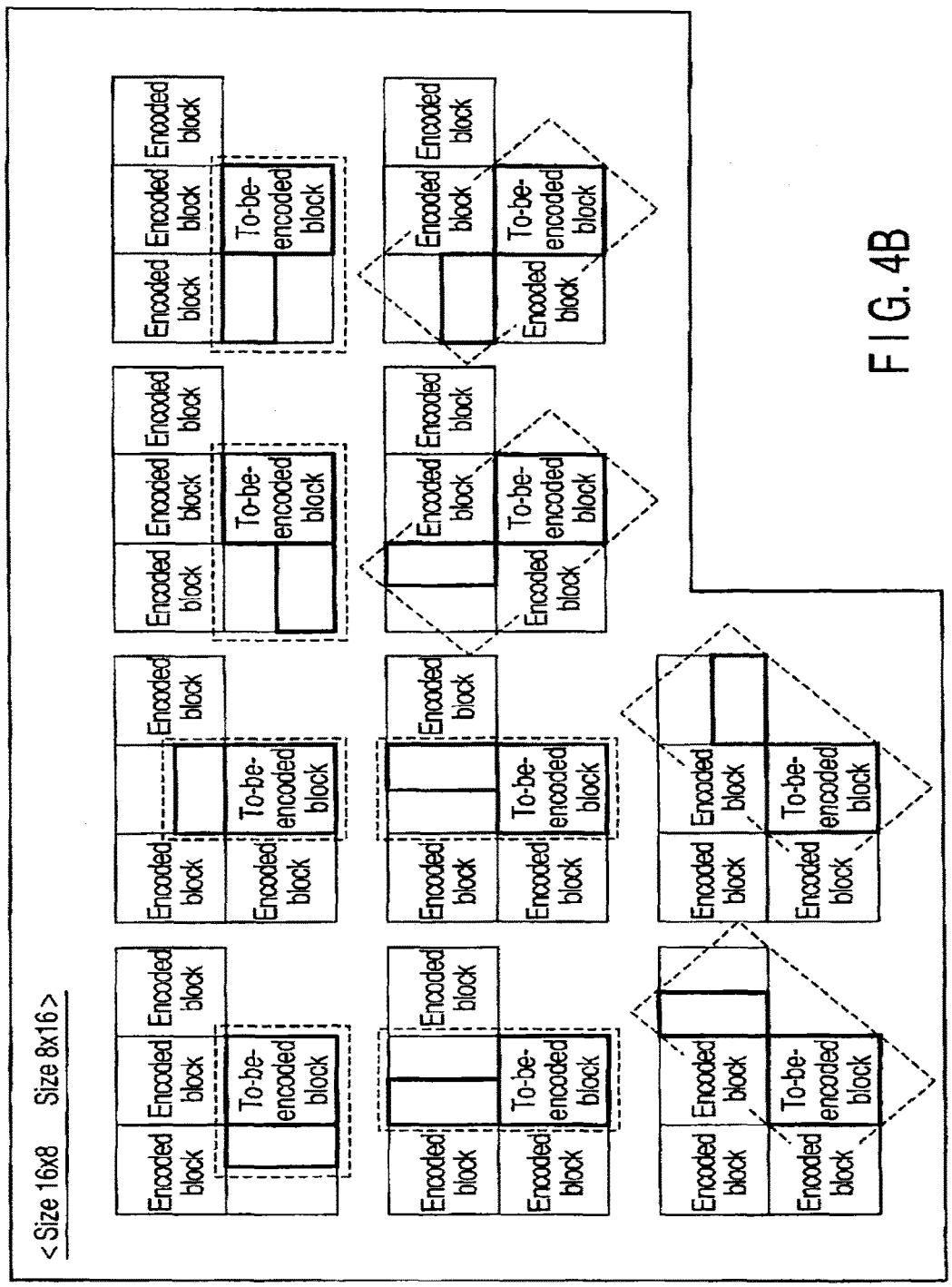
FIG. 4B is a diagram for describing a discrimination method based on a block size.
Figure 4C:
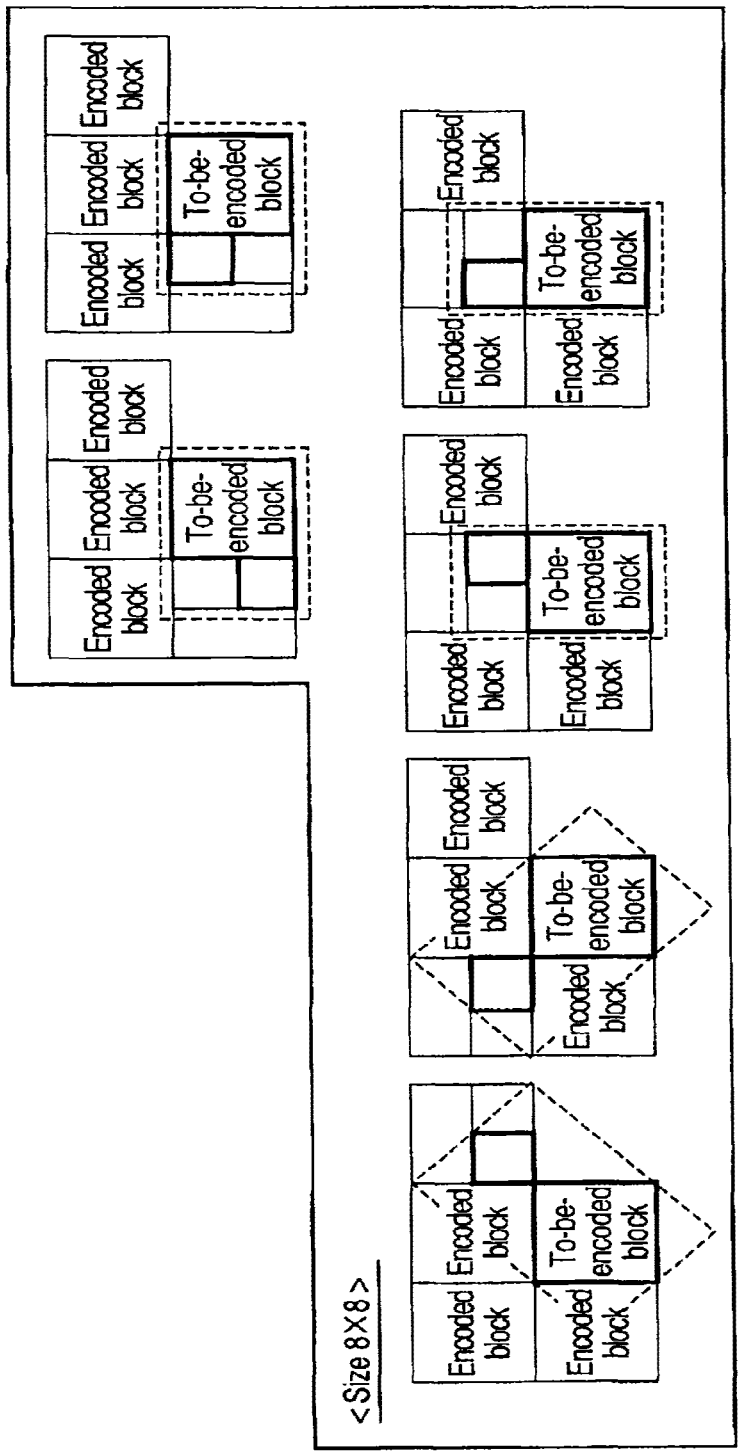
FIG. 4C is a diagram for describing a discrimination method based on a block size.

When the block size is a size 16×16, the block sizes for motion compensated prediction of the adjacent blocks are four kinds of size 16×16, size 16×8, size 8×16 and size 8×8 as shown in FIGS. 4A to 4C. Considering these four kinds, the adjacent blocks that may be available blocks are 20 kinds as shown in FIGS. 4A to 4C. In other words, there are four kinds for size 16×16 as shown in FIG. 4A, 10 kinds for size 16×8 as shown in FIG. 4B, and six kinds for size 8×8 as shown in FIG. 4C. In discrimination of the block size (S102), the available block is searched for according to the block size from 20 kinds of blocks. For example, when the size of the available block is assumed to be only size 16×16, the available blocks determined by this block size are four kinds of blocks of size 16×16 as shown in FIG. 4A. In other words, the available blocks are a block on the upper left side of the to-be-encoded block, a block on the upper side of the to-be-encoded block, and a block on the left side of the to-be-encoded block and a block on the upper right side of the to-be-encoded block. In addition, even if the macroblock size was expanded not less than size 16×16, it can be the available block similarly to the macroblock size of 16×16. For example, when the macroblock size is 32×32, the block size for motion compensated prediction of the adjacent block are four kinds of size 32×32, size 32×16, size16×32, and size 16×16, and the adjacent blocks that may be the available blocks are 20 kinds.

There will be described the determination of the unidirectional prediction or bidirectional prediction which is executed by the acquisition/selection module 110 (S103) with reference to FIG. 5.

Figure 5:
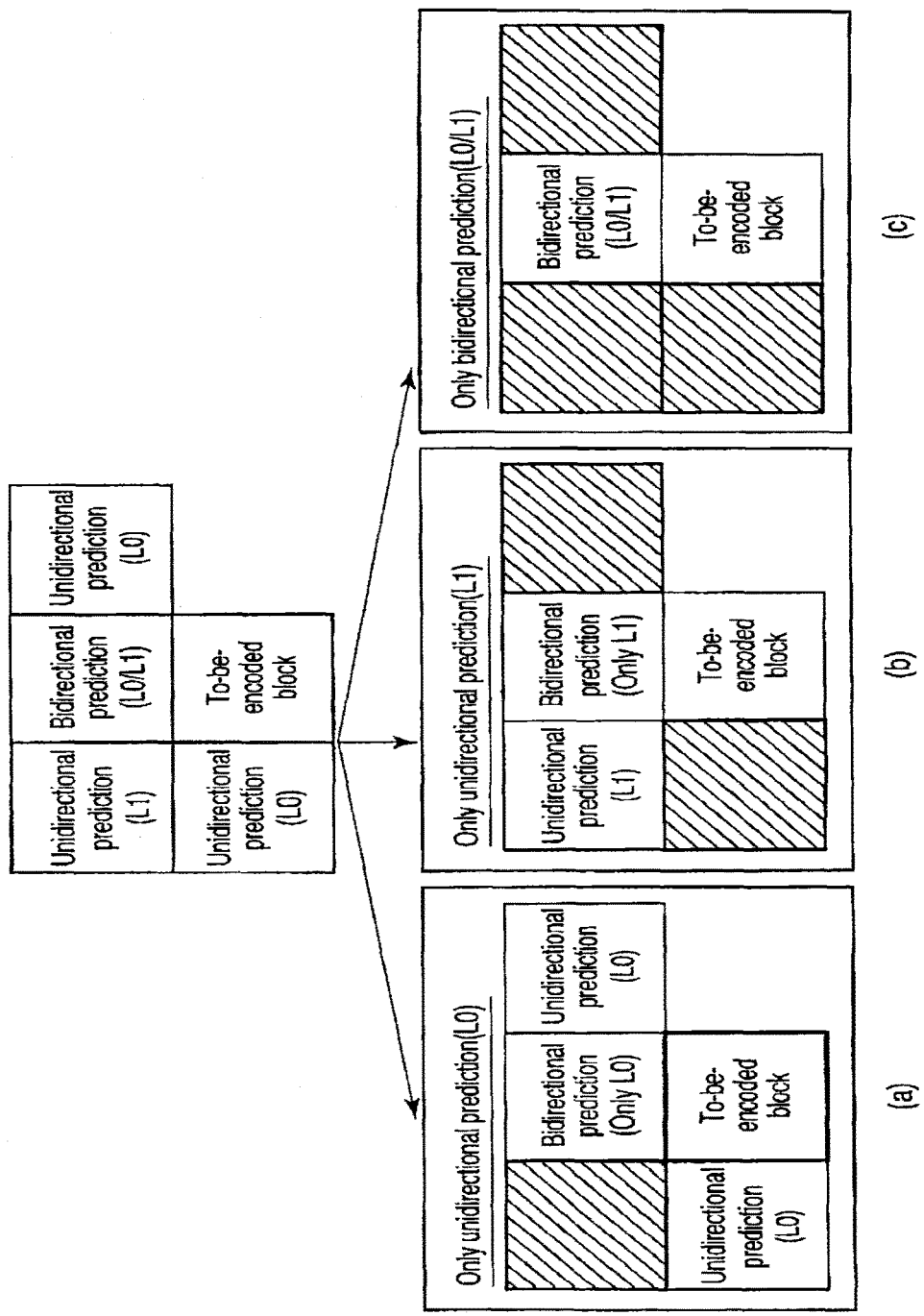
FIG. 5 is a diagram for describing a discrimination method by a unidirectional or a bidirectional.

For example, the block size is limited to 16×16, and the unidirectional or bidirectional prediction of the adjacent block with respect to the to-be-encoded block is assumed to be a case as shown in FIG. 5. In discrimination of the unidirectional or bidirectional prediction (S103), the available block is searched for according to the direction of prediction. For example, the adjacent block having a prediction direction L0 is assumed to be an available block determined in the prediction direction. In other words, the upper, left and upper right blocks of the to-be-encoded blocks shown in FIG. 5 (a) are available blocks determined in the prediction direction. In this case, the upper left block of the to-be-encoded blocks is not employed. When the adjacent block including the prediction direction L1 is assumed to be the available block determined in the prediction direction, the upper left and upper blocks of the to-be-encoded blocks shown in FIG. 5 (b) are available blocks determined in the prediction direction. In this case, the left and upper right blocks of the to-be-encoded blocks are not employed. When the adjacent block including the prediction direction L0/L1 is assumed to be the available block determined in the prediction direction, only the upper block of the to-be-encoded blocks shown in FIG. 5 (c) is the available block determined in the prediction direction. In this case, the left, upper left and upper right blocks of the to-be-encoded blocks are not employed. In addition, the prediction direction L0 (L1) corresponds to the prediction direction of the L0 prediction (L1 prediction) in AVC.

Figure 6:
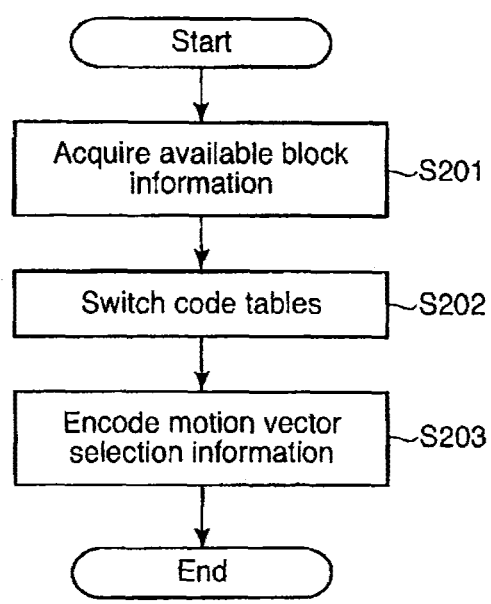
FIG. 6 is a flowchart representing a processing procedure of a selection information encoder.

There will be described the selection information encoder 112 referring to flowchart shown in FIG. 6.

Figures 8, 9:
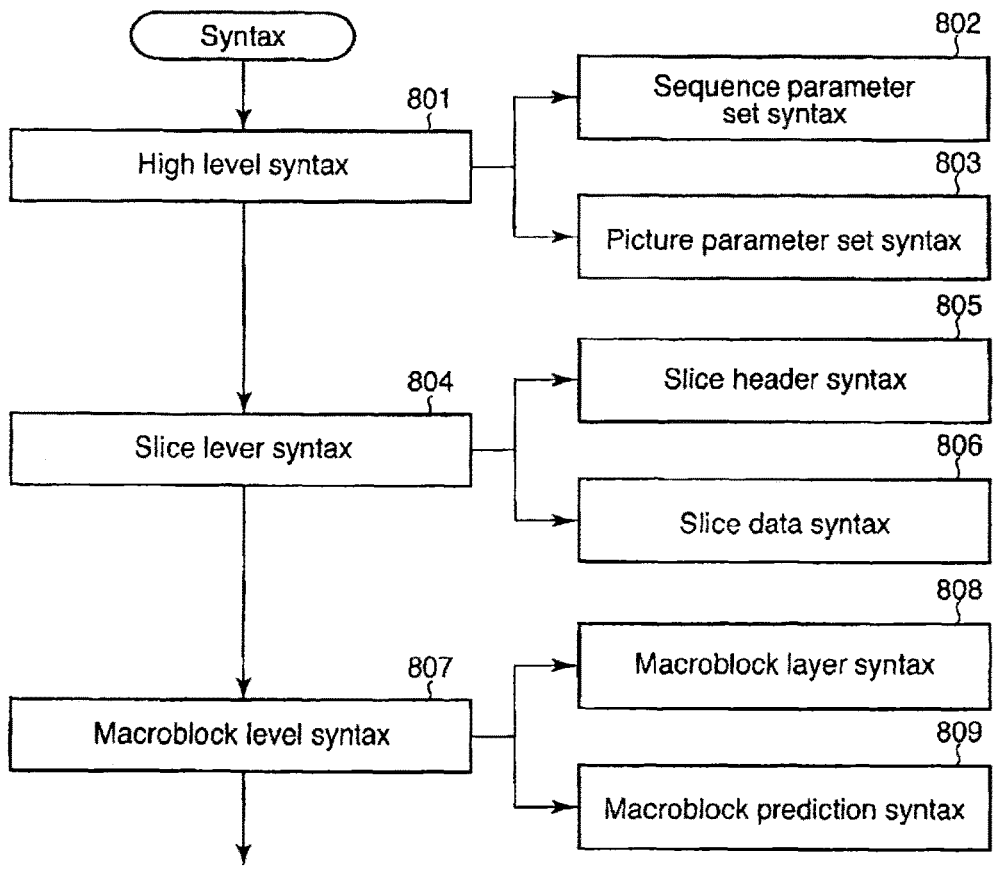
FIG. 8 shows an example of a code table of selection information.
FIG. 9 is a schematic view of a syntax structure.

The available block of the encoded block having a motion vector is searched for from among adjacent blocks adjacent to the to-be-encoded block, and the available block information determined by the block size and the unidirectional or bidirectional prediction is acquired (S201). The code tables corresponding to the number of available blocks as shown in FIG. 8 are switched using this available block information (S202). The selection information 17 sent from the acquisition/selection module 110 is subjected to variable length coding using a changed code table (S203).

Figure 7:
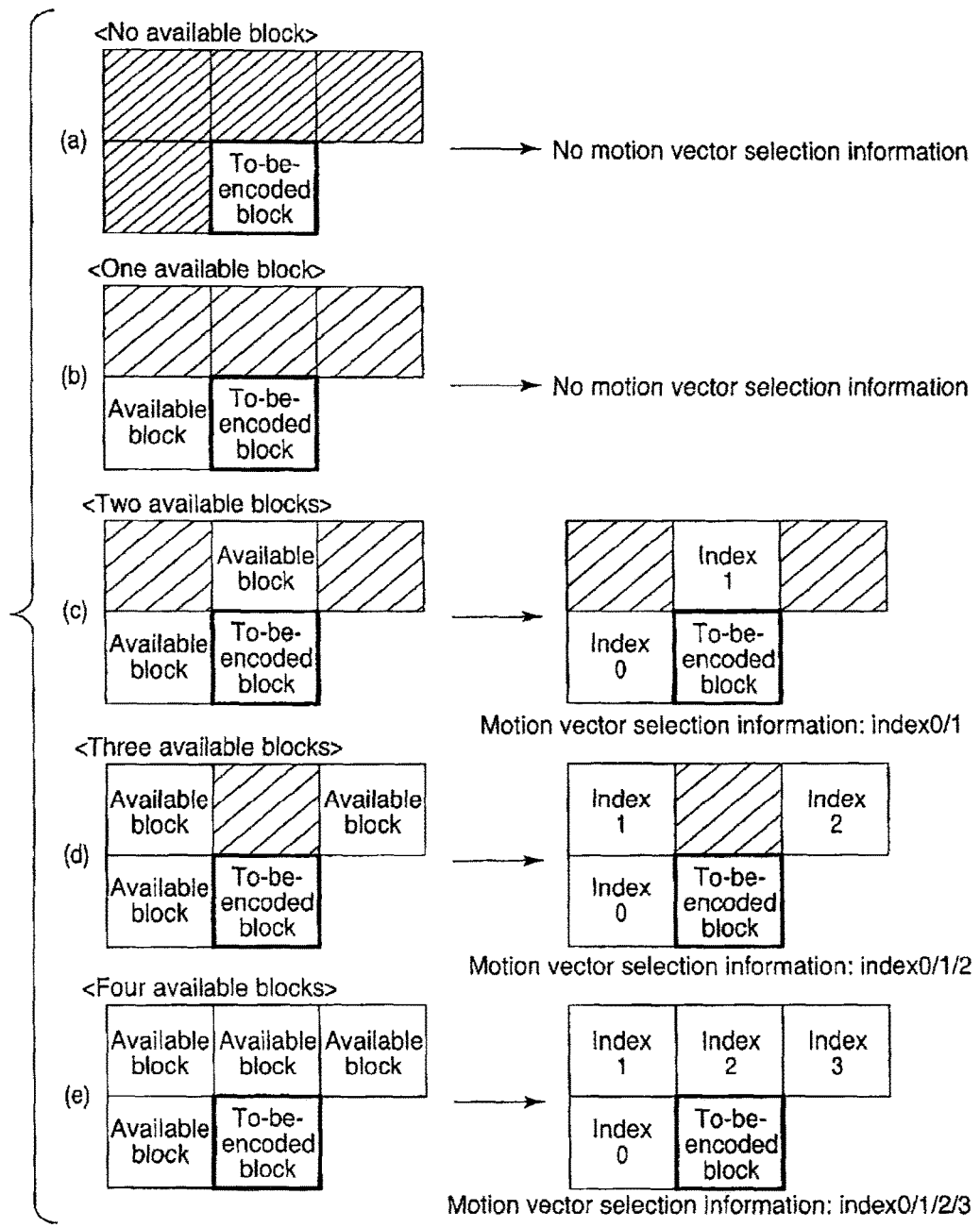
FIG. 7 shows an example of an index of selection information.

An example of an index of selection information is explained referring to FIG. 7 next.

When there is no available block as shown in FIG. 7 (a), the selection information is not sent because the present invention is inapplicable to this block. When there is one available block as shown in FIG. 7 (b), the selection information is not sent because a motion vector of an available block used for motion compensation of the to-be-encoded block is determined in unique. When there are two available blocks as shown in FIG. 7 (c), the selection information of an index 0 or 1 is sent. When there are three available blocks as shown in FIG. 7 (d), the selection information of an index 0, 1 or 2 is sent. When there are four available blocks as shown in FIG. 7 (e), the selection information of an index 0, 1, 2 or 3 is sent.

In addition, as an example of setting an index of the available block, an example of setting the index to the available block in order of the left, upper left, upper and upper right of the to-be-encoded blocks is shown in FIG. 7. In other words, the index is set to the block to be used except for the block which is not used.

There will be described a code table of the selection information 17 referring to FIG. 8 next.

The selection information encoder 112 switches the code table according to the number of available blocks (S202). As mentioned above, when there are two or more available blocks, the selection information 17 must be encoded.

At first when there are two available blocks, indexes 0 and 1 are needed, and the code table is indicated by the table on the left side of FIG. 8. When there are three available blocks, indexes 0, 1 and 2 are needed, and the code table is indicated by the table on the center of FIG. 8. When there are four available blocks, indexes 0, 1, 2, 3 and 4 are needed, and the code table is indicated by the table on the right side of FIG. 8. These code tables are switched according to the number of available blocks.

There will be explained an encoding method of the selection information.

FIG. 9 shows a schematic diagram of a structure of syntax used in this embodiment.

The syntax comprises mainly three parts, wherein High Level Syntax 801 is filled with syntax information of the upper layer not less than a slice. Slice Level Syntax 804 specifies information necessary for every slice, Macroblock Level Syntax 807 specifies a variable length coded error signal or mode information which is needed for every macroblock.

These syntaxes each comprise more detailed syntaxes. The High Level Syntax 801 comprises syntaxes of sequence and picture levels such as Sequence parameter set syntax 802 and Picture parameter set syntax 803. Slice Level Syntax 804 comprises Slice header syntax 405, Slice data syntax 406 and so on. Further, Macroblock Level Syntax 807 comprises macroblock layer syntax 808, macroblock prediction syntax 809 and so on.

The syntax information necessary for this embodiment is macroblock layer syntax 808. The syntax is described hereinafter.

The "available_block_num" shown in FIGS. 10 (a) and (b) indicates the number of available blocks. When this is two or more, it is necessary to encode the selection information. In addition, the "mvcopy_flag" indicates a flag representing whether the motion vector of the available block is used in the motion compensated prediction. When there are one or more available blocks and the flag is "1", the motion vector of the available block can be used in the motion compensated prediction. Further, the "mv_select_info" indicates the selection information, and the code table is as described above.

FIG. 10 (a) shows a syntax when selection information is encoded after "mb_type." When, for example, the block size is only size 16×16, the "mvcopy_flag and mv_select_info" needs not be encoded if the "mb_type" is other than 16×16. If mb_type is 16×16, mvcopy_flag and mv_select_info are encoded.

FIG. 10 (b) shows a syntax when selection information is encoded before mb_type. If, for example, mvcopy_flag is 1, it is not necessary to encode mb_type. If mv_copy_flag is 0, mb_type is encoded.

In this embodiment, what order may be employed in a scan order for encoding. For example, a line scan or a Z scan is applicable to the present invention.

Figure 11:
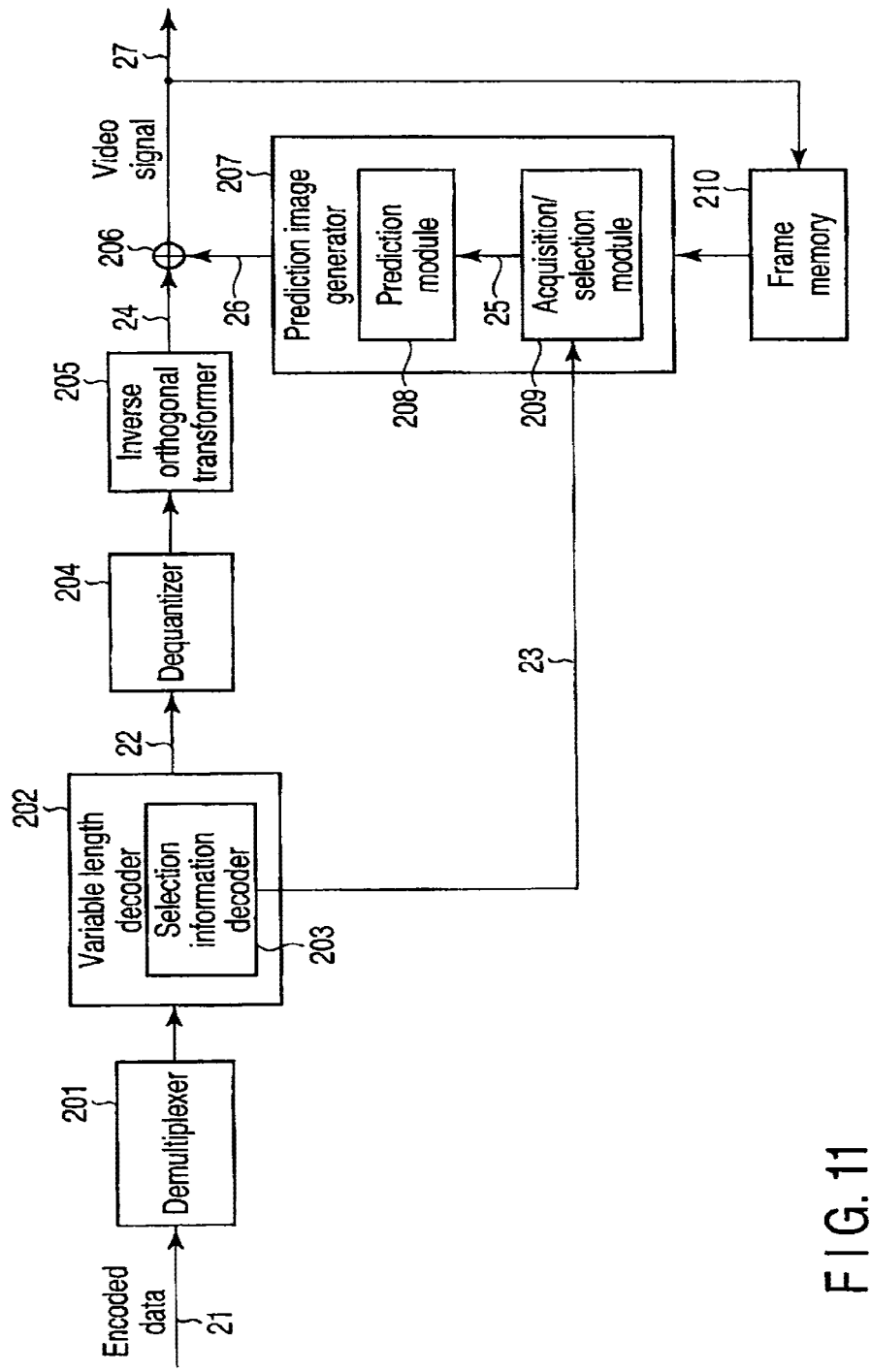
FIG. 11 shows a block diagram of a video decoding apparatus related to the embodiment of the present invention.

There will be a video decoding apparatus related to another embodiment with reference to FIG. 11.

The coded data 18 output from the video encoding apparatus of FIG. 1 is input to a demultiplexer 201 of the video decoding apparatus as encoded data 21 to be decoded through a storage system or a transmission system. The demultiplexer 201 demultiplexes the encoded data 21 to separate the encoded data 21 into quantization orthogonal transformation coefficient information and selection information. The output terminal of the demultiplexer 201 is connected to a variable length decoder 202. The variable length decoder 202 decodes the quantization orthogonal transformation coefficient information and the selection information. The output terminal of the variable length decoder 202 is connected to an adder 206 via a dequantizer 204 and an inverse orthogonal transformer 205. The dequantizer 204 dequantizes the quantized orthogonal transformation coefficient information to transform it to an orthogonal transformation coefficient. The inverse orthogonal transformer 205 subjects the orthogonal transformation coefficient to inverse orthogonal transform to generate a prediction error signal. The adder 206 adds the prediction error signal to the predictive coded video signal from a prediction image generator 207 to produce a video signal.

The prediction image generator 207 includes a prediction module 208 and an acquisition/selection module 209. The acquisition/selection module 209 selects a selection block from available blocks using selection information 23 decoded by the selection information decoder 203 of the variable length decoder 202 and sends a motion vector 25 of the selection block to a prediction module 208. The prediction module 208 motion-compensates a reference image stored in a frame memory 210 by the motion vector 25 to produce a prediction image.

The action of the video decoding apparatus of the above configuration will be described referring to flowchart of FIG. 12.

The demultiplexer 201 demultiplexes the coded data 21 (S31), and the variable length decoder 202 decodes it to produce quantized orthogonal transformation coefficient information 22 (S32). In addition, the selection information decoder 203 checks the condition of the adjacent block adjacent to a to-be-decoded block and decode it by switching code tables according to the number of the available blocks of the adjacent encoded blocks having motion vectors as shown in FIG. 8, similarly to the selection information encoder 112 of the encoding apparatus, thereby to produce the selection information 23 (S33).

The quantized orthogonal transformation coefficient information 22 that is information output from the variable length decoder 202 is sent to the dequantizer 204, and the selection information 23 which is information output from selection information decoder 203 is sent to the acquisition/selection module 209.

The quantization orthogonal transformation coefficient information 22 is dequantized with the dequantizer 204 (S34), and then subjected to inverse orthogonal transform with the inverse orthogonal transformer 205 (S35). As a result, the prediction error signal 24 is obtained. The adder 206 adds the prediction image signal to the prediction error signal 24 to reproduce a video signal 26 (S36). The reproduced video signal 27 is stored in the frame memory 210 (S37).

The prediction image generator 207 generates the prediction image 26 using the motion vector of the available block that is the decoded block neighboring the to-be-decoded block and having a motion vector, the motion vector being a motion vector of a selection block selected on the basis of the decoded selection information 23. The acquisition/selection module 209 selects the selection block from the adjacent blocks on the basis of the available block information of the adjacent block and the selection information 23 decoded with the selection information decoder 203, similarly to the acquisition/selection module 110 of the coding apparatus. The prediction module 208 generates the prediction image 26 using this selected motion vector 25, and sends it to the adder 206 to produce a video signal 27.

According to the present invention, encoding the selection information according to the number of available blocks allows the selection information to be sent using a suitable code table, resulting in that additional information of the selection information can be reduced.

In addition, using the motion vector of the available block for the motion compensated prediction of the to-be-encoded block allows the additional information on the motion vector information to be reduced.

Furthermore, the motion vector calculation method is not fixed and improves degrees of freedom of motion vector calculation as compared with a direct mode by selecting an appropriate one from among the available blocks.

The technique of the present invention recited in the embodiment of the present invention may be executed with a computer and also may be distributed as a program capable of causing a computer to execute by storing it in a recording medium such as a magnetic disk (flexible disk, a hard disk, etc.), an optical disk (CD-ROM, DVD, etc.), a semiconductor memory, etc.

In addition, the present invention is not limited to the above embodiments and may be modified in component within a scope without departing from the subject matter of the invention.

In addition, it is possible to provide various inventions by combining appropriately a plurality of components disclosed in the above embodiments. For example, some components may be deleted from all components shown in the embodiments. Further, the components of different embodiments may be combined appropriately.

The apparatus of the present invention is applied to an image compression process in a communication, a storage and a broadcast.

A part or all of the encoding apparatus and decoding apparatus relating to the above embodiments may be implemented as a integrated circuit such as LSI (Large Scale Integration) or as a set of Integrated Circuit chips. An integrated-circuit technology is not limited to LSI and may be realized by a dedicated circuit or a general-purpose processor.

Each of function blocks as shown in FIGS. 2, 3, 6 and 12 may be implemented by a respective processor or a part or all of each function block are integrated into a processor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video decoding apparatus for subjecting a video image to motion compensated decoding, the apparatus comprising:
   processing circuitry configured to:
   acquire a to-be-decoded block and a number of available blocks from a decoded block adjacent to the to-be-decoded block;
   decode selection information specifying an index of a block;
   switch a code table according to the number of the available blocks of the adjacent blocks, wherein the available blocks are determined by the block size, the unidirectional or bidirectional prediction modes of available blocks and the prediction modes of the to-be-decoded block and the available blocks are decoded neighboring blocks having motion vectors;
   select a block from the available blocks based on the code table and the selection information;
   generate the to-be-decoded block using a motion vector of the selected block,
   wherein when there are two available blocks, a code table including two indexes 0 and 1 is selected, when there are three available blocks, a code table including indexes 0, 1 and 2 is selected, and when there are four available blocks, a code table including indexes 0, 1, 2 and 3 is selected.

2. A video decoding method for subjecting a video image to motion compensated decoding, the method comprising:
   acquiring a to-be-decoded block and a number of available blocks from a decoded block adjacent to the to-be-decoded block;
   decoding selection information regarding the block, and not decoding the selection information when the number of the block is 1;
   switching a code table according to the number of the available blocks of the adjacent blocks, wherein the available blocks are determined by the block size, the unidirectional or bidirectional prediction modes of available blocks and the prediction modes of the to-be-decoded block and the available blocks are decoded neighboring blocks having motion vectors;
   selecting a block from the available blocks based on the code table and the selection information; and
   generating the to-be-decoded block using a motion vector of the selected block,
   wherein when there are two available blocks, a code table including two indexes 0 and 1 is selected, when there are three available blocks, a code table including indexes 0, 1 and 2 is selected, and when there are four available blocks, a code table including indexes 0, 1, 2, and 3 is selected.

3. A non-transitory computer-readable medium storing instructions that, when executed, cause a computer to subject a video image to motion compensated decoding, the instructions causing the computer to execute
   a step of acquiring a to-be-decoded block and a number of available blocks from a decoded block adjacent to the to-be-decoded block;
   a step of decoding selection information regarding the block, and a step of not decoding the selection information when the number of the block is 1;
   a step of switching a code table according to the number of the available blocks of the adjacent blocks, wherein the available blocks are determined by the block size, the unidirectional or bidirectional prediction modes of available blocks and the prediction modes of the to-be-decoded block and the available blocks are decoded neighboring blocks having motion vectors;
   a step of selecting a block from the available blocks based on the code table and the selection information; and
   a step of generating the to-be-decoded block using a motion vector of the selected block,
   wherein when there are two available blocks, a code table including two indexes 0 and 1 is selected, when there are three available blocks, a code table including indexes 0, 1 and 2 is selected, and when there are four available blocks, a code table including indexes 0, 1, 2, and 3 is selected.

4. A video decoding apparatus for subjecting a video image to motion compensated decoding, the apparatus decoding an encoded data by performing:
   acquiring a to-be-decoded block and a number of available blocks from a decoded block adjacent to the to-be-decoded block;
   decoding selection information regarding the block, and not decoding the selection information when the number of the block is 1;
   switching a code table according to the number of the available blocks of the adjacent blocks, wherein the available blocks are determined by the block size, the unidirectional or bidirectional prediction modes of available blocks and the prediction modes of the to-be-decoded block and the available blocks are decoded neighboring blocks having motion vectors;
   selecting a block from the available blocks based on the code table and the selection information; and
   generating the to-be-decoded block using a motion vector of the selected block, wherein when there are two available blocks, a code table including two indexes 0 and 1 is selected, when there are three available blocks, a code table including indexes 0, 1 and 2 is selected, and when there are available four blocks, a code table including indexes 0, 1, 2, and 3 is selected.

5. A video decoding method for subjecting a video image to motion compensated decoding, the method decoding an encoded data by performing:

acquiring a to-be-decoded block and a number of available blocks from a decoded block adjacent to the to-be-decoded block;

decoding selection information regarding the block, and not decoding the selection information when the number of the block is 1;

switching a code table according to the number of the available blocks of the adjacent blocks, wherein the available blocks are determined by the block size, the unidirectional or bidirectional prediction modes of available blocks and the prediction modes of the to-be-decoded block and the available blocks are decoded neighboring blocks having motion vectors;

selecting a block from the available blocks based on the code table and the selection information; and generating the to-be-decoded block using a motion vector of the selected block, wherein when there are two available blocks, a code table including two indexes 0 and 1 is selected, when there are three available blocks, a code table including indexes 0, 1 and 2 is selected, and when there are four available blocks, a code table including indexes 0, 1, 2, and 3 is selected.

* * * * *